W. KAISLING.
SUBSTATION PROTECTOR UNIT.
APPLICATION FILED DEC. 11, 1905.
955,806.
Patented Apr. 19, 1910.
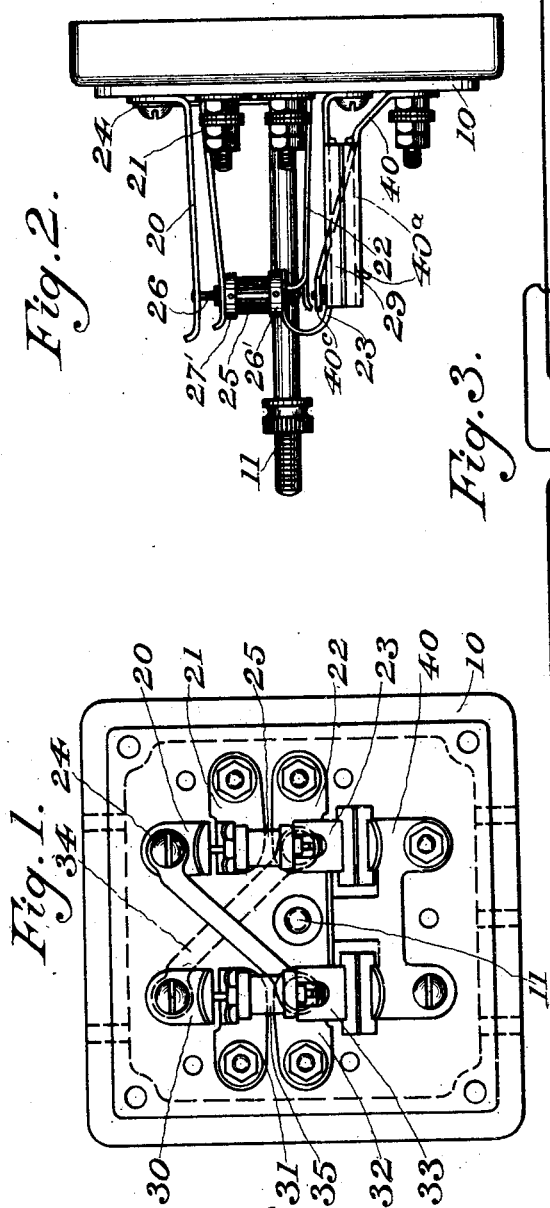
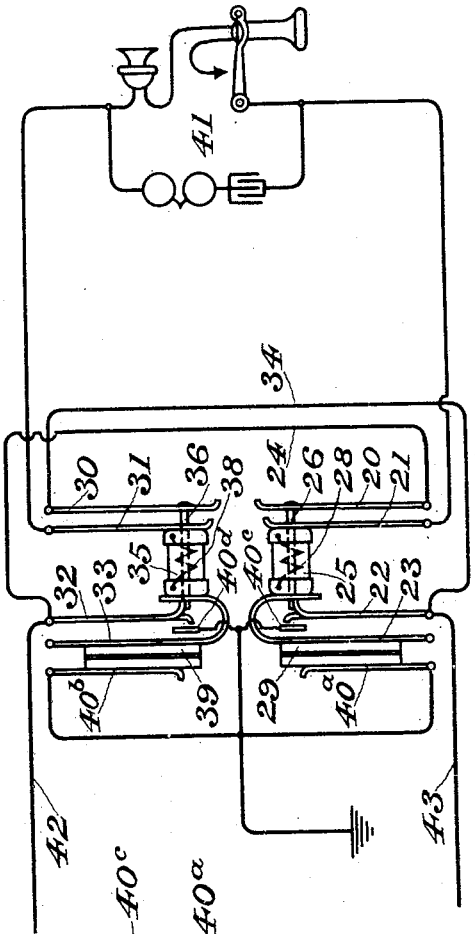
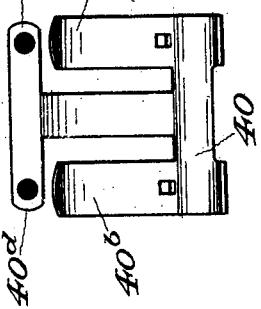
Witnesses:
William Kaisling,
Inventor.
by Kempster B Miller
Attorney.

UNITED STATES PATENT OFFICE.

WILLIAM KAISLING, OF CHICAGO, ILLINOIS, ASSIGNOR TO FRANK B. COOK, OF CHICAGO, ILLINOIS.

SUBSTATION PROTECTOR UNIT.

955,806. Specification of Letters Patent. Patented Apr. 19, 1910.

Application filed December 11, 1905. Serial No. 291,230.

*To all whom it may concern:*

Be it known that I, WILLIAM KAISLING, a citizen of the United States of America, and resident of Chicago, county of Cook, and State of Illinois, have invented a new and useful Improvement in Substation Protector Units, of which the following is a specification.

My invention consists in an improvement in thermal protector devices for telephones and telephone circuits, and has for its object the production, upon partial operation of the device, of a more complete protective condition than the prior art has afforded.

In this specification and in the drawings accompanying it, I have shown a protector unit suitable for installation at a telephone substation and designed, as is the practice in such installations, to protect the substation telephone apparatus from lightning or other high-potential conditions, and from continuous currents, or so-called sneak currents of greater volume than the current which the substation telephone apparatus is designed to bear without injury. The circuits of this protector are applicable also to a protector for installation in a central office for similar protection to the switchboard and associated apparatus.

In the drawings, Figure 1 is a plan of the complete substation telephone protector unit, but with glass cover omitted; Fig. 2 is a side elevation of the same. Fig. 3 is a circuit drawing, involving also a diagrammatic representation of the springs and heat coils of the protector in such detail as to disclose clearly their mode of operation and Fig. 4 is an elevation of the ground spring 40 removed from the assembly of Fig. 1.

The mechanical details of the protector unit, as shown in Figs. 1 and 2, are as follows: Upon a porcelain base 10 is mounted a post 11, screw-threaded and provided with a nut, the post and nut being designed to clamp a glass canopy upon the porcelain base and thus to inclose a space to include the protective apparatus and circuit terminals. Within the space thus inclosed are mounted two sets of springs, 20, 21, 22, 23, and 30, 31, 32, 33, designed for use by the two sides of the telephone line circuit, respectively, and also a ground spring 40 having four electrical contact branches, indicated in Fig. 3 as 40ª, 40ᵇ, 40ᶜ and 40ᵈ. Binding post terminals are produced on springs 21, 22, 31, 32 and 40; a conducting bar 24 above the base 10 connects electrically the springs 20 and 32; a similar conducting bar 34, recessed under part of the base 10 connects electrically the springs 30 and 22.

The heat coils 25 and 35 are of a type now on the market and may be regarded as well understood in the present art. Each heat coil, as 25, consists of a metal spool having a pin, as 26, passing through that spool and soldered in place with a solder melting at a comparatively low temperature, say 140 to 160 degrees Fahrenheit; a conductor, as 28 in Fig. 3, of a resistance of a few ohms, is wound upon the spool before mentioned, and is connected at its ends to the two metal caps, as 26' and 27' in Fig. 2, so that a circuit exists through the heat coil from cap 26' through conductor 28 to cap 27', that circuit being insulated from the pin 26, and being designed to warm the solder holding the pin 26 in place by reason of heat generated in the winding 28 when current passes through the heat coil. Heat is dissipated through the radiating surfaces of the caps and adjacent springs, and for currents up to a predetermined critical point the radiation is equal to the heat generated in the winding 28; but when the current through the winding 28 becomes greater than the critical amount, then the heat is generated in the winding more rapidly than it is distributed by the adjacent metal parts, and the temperature of the coil rises until the melting point of the solder is passed; then the solder melts and releases the pin 26, whereupon that pin is driven through the spool by pressure of the spring, as 20, to engage and operate a spring, as 22, at the opposite end of the heat coil.

The operation of the protector unit as a whole is as follows: Being connected in the circuit of the telephone line as shown in Fig. 3, with the line conductors 43 and 42 connected to springs 22 and 32, and with the apparatus to be protected, as at 41, connected to springs 21 and 31, and with the spring 40 grounded, any high-potential which may come upon the line conductor 42 will pass over spring 32 to spring 33, with which 32 is in contact, to one of the carbon blocks of the arrester unit 39, leaping the gap of the insulation between the two carbon blocks of that well known arrester unit to the other of the carbon blocks, thence by branch 40ᵇ of the spring 40 to ground; similarly high-potential conditions will be cared for if upon line conductor 43, over the path 22, 23, 29, 40ᵃ and to ground. An electrical condition not having a potential above the earth sufficiently high to operate through the open space cut-outs 29 and 39, but yet of such nature as to cause a current through the apparatus 41, will operate as follows: Assuming that the current thus flowing is such a one as would be required in the ordinary operation of the apparatus at 41, then the circuit over which it would flow would be 42, 32, 38, 31, 41, 21, 28, 22, 43, the heat produced being below the critical amount required to soften the solder of the coils 25 and 35; when the current rises so high as to be dangerous to the apparatus at 41, the heat generated in the heat coils 25 and 35 will be increased, and these coils are of such design that such a current will produce such a heating effect in the conductors 28 and 38 as to soften the solder and release the pins 26 and 36, permitting the springs 20 and 30 to drive those pins through the spools so that the pin 26 engages the spring 22 and propels it out of connection with the spring 23 and into connection with the branch 40ᶜ of the ground spring 40, and so that the pin 36 engages the spring 32 and propels it out of connection with the spring 33 and into connection with the branch 40ᵈ of the ground spring 40; it is seen therefore that by the sufficient heating of the two coils 25 and 35 the two line conductors 42 and 43 are connected to ground and also to each other, and that the circuit through the apparatus 41 is opened by the separation of the springs 22—23 and 32—33; thus there is provided an ideal condition of electrical protection for the apparatus at 41, since it is entirely isolated from those wires, 42 and 43, from which the undesirable current must come, and an auxiliary path, from wire to wire or from either or both to ground, as may be required, is furnished over which the current may flow harmlessly so far as the apparatus at 41 is concerned. This description of operation has been given to show the result of the perfect operation of the apparatus at the protector unit. But the perfect operation of a protector unit is a thing of theory, and in practice it is found that in many instances one of the heat coils of the pair will operate and the other will not.

It is therefore the object of my invention to provide, upon the operation of either of the heat coils of the pair, for the setting up of conditions of protection approximating very closely the conditions resulting from the operation of both the coils simultaneously. By the apparatus and circuit illustrated, the operation of either of the heat coils will ground both sides of the line, thus also connecting them together, and will open the circuit through the apparatus at 41, thus stopping the flow through it of the current which caused the operation of the one coil. Assume that a flow of current through 42, 32, 38, 31, 41, 21, 28, 22, 43 from and to some external source, has operated coil 25 but not coil 35; pin 26 will have engaged spring 22 and will have forced it out of contact with spring 23 and into engagement with branch 40ᶜ of the ground spring 40. Circuits now will exist, from 42 to 43 through 42, 24, 20, 26, 22, 43; from 42 to ground through 42, 24, 20, 26, 22, 40ᶜ; from 43 to ground through 43, 22, 40ᶜ; while from the protected apparatus 41 a circuit will extend in one direction through 31, 38, and 32 to the line wire 42 and also from 32 through 24, 20, 26, 22, 40ᶜ to ground, and from 41 in the other direction through 21 and 28 to 23, which is an open terminal to the path through 41, and therefore there is no circuit for current flow through the protected apparatus 41.

Parts 22, 23 and 40 constitute a three-point switch operable by pin 26; parts 26 and 22 also constitute a two-point switch for a separate purpose, while parts 22, 23, 26 and 40 may be considered together but one switch, the whole actuated by tension of spring 20 upon operation of the heat coil associated therewith.

I do not wish to limit myself in all respects to the details shown in the drawings and specification of this application, knowing well that many modifications may be made in the apparatus and circuits to secure the same or similar results quite within the spirit and scope of my invention.

Having thus described my invention, what I claim as new and desire to protect by United States Letters Patent, is:

1. In a thermal protector unit for telephone lines, two heat coils, two line conductors connected serially with the heat producing elements of said heat coils respectively, a ground conductor, and two electrical switches held against operation by said heat coils respectively and permitted to operate by said heat coils respectively when heated, each of said electrical switches operating to connect together electrically both of said line conductors and said ground conductor, substantially as described.

2. In a thermal protector unit for telephone lines, two line conductors; a ground conductor; a heat coil having its heat producing element connected in series with one of said line conductors; a switch held against operation by said heat coil and operating to switch together said two line conductors and said ground conductor, substantially as described.

3. In a thermal protector unit for telephone lines, two heat coils, two line conductors passing to the heat producing elements of said two heat coils, respectively, and a leg from each of said line conductors separately connected to open electrical contacts controlled respectively by the operation of the heat coil whose heat producing element is associated with the corresponding other line conductor, substantially as described.

4. In a thermal protector for telephone lines, two heat coils; two line conductors; said two line conductors being connected in series with the heating elements of said two heat coils respectively; two electrical switches mechanically associated with said two heat coils respectively, the movable element of each switch projecting into the path of a movable element of its mechanically associated heat coil whereby by the operation of either heat coil the mechanically associated switch of that heat coil will be operated also; and two branch conductors extending respectively each from one of said line conductors to an element of the electrical switch mechanically associated with the heat coil having its heating element connected with the alternative line conductor, substantially as described.

5. In a thermal protector unit for telephone lines, a line conductor, a heat coil, the winding of said heat coil being connected to said line conductor and forming an extension of that conductor, another line conductor connected to the releasable part of said heat coil, and a contact part connected with said first line conductor and adapted to receive contact with said releasable part of said heat coil when that part is released, thereby effecting a connection between the two said line conductors, substantially as described.

6. In a thermal protector unit for telephone lines, an apparatus conductor, a heat coil, two line conductors, a ground conductor, a circuit extending between said two line conductors and including said apparatus conductor, a switch controlled by said heat coil to open said circuit upon the operation of said heat coil, and another switch controlled by said heat coil to switch together said two line conductors and said ground conductor upon the operation of said heat coil, substantially as described.

7. In a thermal protector unit for telephone lines, two line terminals, a ground terminal, a heat coil and an electrical switch, said switch normally holding connected one of said line terminals and the heat producing element of said heat coil, and normally holding disconnected branches from said two line terminals and from said ground terminals, said switch being controlled by said heat coil, substantially as described.

8. In a thermal protector unit for telephone lines, a heat coil and a switch of four parts, the first and second of said parts being normally connected in said switch, and the second third and fourth of said parts being normally disconnected in said switch, the first and second of said parts being connected electrically with the heat producing element of said heat coil and with a line terminal respectively, the third and fourth of said parts being connected electrically with another line terminal and with a ground terminal respectively, said switch being controlled by said heat coil, substantially as described.

9. In a thermal protector unit for telephone lines, two line limbs; a ground conductor; a heat coil; and a switch; said heat coil having its heat producing element connected in series with the first of said line limbs, said switch operating to close together said ground conductor and the second of said line limbs, said switch being controlled by said heat coil, substantially as described.

10. In a thermal protector unit for telephone lines, an apparatus conductor, a heat coil having its heat-producing elements associated with said circuit, two line conductors, a circuit extending between said two line conductors and including said apparatus conductor, a switch adapted to open said circuit upon the operation of said heat coil, and another switch adapted to switch together said two line conductors and ground upon the operation of said heat coil, substantially as described.

11. In a thermal protector unit for telephone lines, an apparatus conductor, a heat coil having its heat-producing elements associated with said circuit, two line conductors, a circuit extending between said two line conductors and including said apparatus conductor, a switch adapted to open said circuit upon the operation of said heat coil, and another switch associated with said heat coil and adapted to switch together said two line conductors and ground upon the operation of said heat coil, substantially as described.

12. In a thermal protector unit for telephone lines, a ground terminal, two terminals adapted to receive line conductors, two terminals adapted to receive apparatus conductors associated with apparatus to be protected, and associated each through intervening conducting parts with one of said line terminals, two heat coils, each adapted to operate switches when actuated, one of said heat coils being associated with one of said line terminals and one of said apparatus terminals, and the second of said heat coils being associated with the second of said line terminals and the second of said apparatus terminals, two switches associated one with each line terminal, each switch being operable by the heat coil associated with its line terminal, and each adapted to switch its line terminal from connection with its associated heat coil to connection with said ground terminal, and two additional switches, associated each with one of said heat coils and each being operable by the actuation of its associated heat coil, and each adapted independently to switch together when operated said two line terminals, substantially as described.

13. In a thermal protector unit for telephone lines, a ground terminal, two terminals adapted to receive line conductors, two terminals adapted to receive apparatus conductors associated with apparatus to be protected, and associated each through intervening conducting parts with one of said line terminals, two heat coils, each adapted to operate switches when actuated, one of said heat coils being associated with one of said line terminals and one of said apparatus terminals, and the second of said heat coils being associated with the second of said line terminals and the second of said apparatus terminals, two switches associated one with each line terminal, each switch being operable by the heat coil associated with its line terminal, and each adapted to switch its line terminal from connection with its associated apparatus to connection with said ground terminal, and two additional switches, associated each with one of said heat coils and each being operable by the actuation of its associated heat coil, and each adapted independently to switch together when operated said two line terminals, substantially as described.

14. In a thermal protector unit for telephone lines, a ground terminal, two line terminals, two apparatus terminals, electrical switch elements, a heat coil associated with one of said line terminals and one of said apparatus terminals and adapted to operate to move some of said electrical switch elements to effect the disconnection of its associated line terminal from its associated apparatus terminal, the connection of its associated line terminal with said ground terminal, and the connection together of the two said line terminals, substantially as described.

15. In a thermal protector unit for telephone lines, a ground terminal, two line terminals, two apparatus terminals, electrical switch elements, and two heat coils adapted to operate some of said switch elements to cause the isolation of said apparatus terminals and the connection together of said line terminals and ground, substantially as described.

Signed by me at Chicago, county of Cook and State of Illinois in the presence of two witnesses.

WILLIAM KAISLING.

Witnesses:
   EVA A. GARLOCK,
   HAZAEL C. PRADO.